US011560240B2

(12) United States Patent
Quatmann et al.

(10) Patent No.: US 11,560,240 B2
(45) Date of Patent: Jan. 24, 2023

(54) AIRCRAFT AREA HAVING A TEXTILE DISPLAY, AIRCRAFT PASSENGER SEAT HAVING A TEXTILE DISPLAY, AND AIRCRAFT INCLUDING AN AIRCRAFT AREA

(71) Applicants: AIRBUS OPERATIONS GMBH, Hamburg (DE); AIRBUS (S.A.S.), Blagnac (FR)

(72) Inventors: Frank Quatmann, Seevetal (DE); Nicolas Jourdan, Blagnac (FR)

(73) Assignees: Airbus Operations GmbH, Hamburg (DE); Airbus (S.A.S.), Blagnac (FR)

( * ) Notice: Subject to any disclaimer, the term of this patent is extended or adjusted under 35 U.S.C. 154(b) by 269 days.

(21) Appl. No.: 16/588,187

(22) Filed: Sep. 30, 2019

(65) Prior Publication Data

US 2020/0094985 A1 Mar. 26, 2020

Related U.S. Application Data

(63) Continuation-in-part of application No. 16/363,436, filed on Mar. 25, 2019, now Pat. No. 10,990,681.
(Continued)

(30) Foreign Application Priority Data

Feb. 25, 2019 (EP) .................................... 19159223

(51) Int. Cl.
*B64D 45/00* (2006.01)
*B64D 11/00* (2006.01)
(Continued)

(52) U.S. Cl.
CPC ........ *B64D 45/00* (2013.01); *B64D 11/00151* (2014.12); *B64D 11/00155* (2014.12);
(Continued)

(58) Field of Classification Search
CPC .............. B64D 45/00; B64D 11/00151; B64D 11/00155; B64D 2045/007; G09G 3/2003;
(Continued)

(56) References Cited

U.S. PATENT DOCUMENTS 5,069,401 A * 12/1991 Shepherd ............... B64D 25/00
244/118.5
6,511,198 B1 * 1/2003 Erickson .............. A41D 27/085
313/510
(Continued)

FOREIGN PATENT DOCUMENTS

CN 110316380 A 10/2019
DE 10 2006 017 732 A1 10/2007
(Continued)

OTHER PUBLICATIONS

European Office Action for Application No. 19165878.0 dated May 12, 2021.
(Continued)

*Primary Examiner* — Douglas M Slachta
(74) *Attorney, Agent, or Firm* — Jenkins, Wilson, Taylor & Hunt, P.A.

(57) ABSTRACT

An aircraft area having a textile display, aircraft passenger seat having a textile display, and aircraft including an aircraft area. An aircraft area includes an interior component, a textile display on the interior component and including at least one textile fiber capable of changing a color at at least one section of the textile fiber, and a controller operatively coupled to the textile display and configured to change color of the at least one section of the textile fiber, such that the textile display displays information. An aircraft passenger seat includes a back rest, seat pan, and textile display integrated into a seat cover covering the backrest and/or the seat pan. The textile display includes at least one textile fiber capable of changing a color at at least one
(Continued)

section of the textile fiber. An aircraft may include one or more aircraft areas and/or one or more aircraft passenger seats.

20 Claims, 3 Drawing Sheets

Related U.S. Application Data (60) Provisional application No. 62/649,888, filed on Mar. 29, 2018.

(51) Int. Cl.
*G09G 3/20* (2006.01)
*G09G 3/34* (2006.01)
*G06F 3/041* (2006.01)

(52) U.S. Cl.
CPC ........... *G09G 3/2003* (2013.01); *G09G 3/344* (2013.01); *B64D 2045/007* (2013.01); *G06F 3/0412* (2013.01); *G09G 2320/0666* (2013.01); *G09G 2354/00* (2013.01); *G09G 2380/12* (2013.01)

(58) Field of Classification Search
CPC ........... G09G 3/344; G09G 2320/0666; G09G 2354/00; G09G 2380/12; G06F 3/0412
See application file for complete search history.

(56) References Cited

U.S. PATENT DOCUMENTS

| | | | | |
|---|---|---|---|---|
| 7,324,093 | B1* | 1/2008 | Gettemy | G06F 1/1698 345/157 |
| 7,674,747 | B1* | 3/2010 | Long | D06P 1/004 503/201 |
| 7,725,629 | B2* | 5/2010 | Sturm | G05B 19/0421 710/72 |
| 8,010,257 | B2 | 8/2011 | Shidai et al. | |
| 8,653,690 | B2 | 2/2014 | Petitpierre | |
| 8,823,395 | B2* | 9/2014 | Bhattacharya | H05K 1/189 198/810.02 |
| 9,092,288 | B2 | 7/2015 | Nagai et al. | |
| 9,187,642 | B2 | 11/2015 | Gaydoul et al. | |
| 9,440,599 | B2 | 9/2016 | Heyden et al. | |
| 9,820,515 | B2* | 11/2017 | Crockett, Jr. | A41D 13/0015 |
| 9,823,833 | B2* | 11/2017 | Grant | G06F 3/016 |
| 9,965,931 | B2 | 5/2018 | Reinbold et al. | |
| 10,081,887 | B2* | 9/2018 | Manipatruni | D02G 3/441 |
| 10,233,571 | B1 | 3/2019 | Alexander | D03D 1/0088 |
| 10,298,492 | B2 | 5/2019 | Kim et al. | |
| 10,482,752 | B2 | 11/2019 | Griffiths | |
| 10,714,055 | B1* | 7/2020 | Strasdat | G06F 3/011 |
| 10,765,325 | B2 | 9/2020 | Berkey et al. | |
| 10,814,986 | B2* | 10/2020 | Stachel | B64D 11/0648 |
| 10,990,681 | B2 | 4/2021 | Quatmann | |
| 2001/0002814 | A1 | 6/2001 | Suganuma et al. | |
| 2002/0070591 | A1 | 6/2002 | Nivet | |
| 2003/0224155 | A1* | 12/2003 | Orth | D06P 1/004 156/49 |
| 2007/0100513 | A1 | 5/2007 | Asano | |
| 2007/0197115 | A1 | 8/2007 | Eves et al. | |
| 2007/0243124 | A1* | 10/2007 | Baughman | H01G 11/22 423/447.1 |
| 2008/0170982 | A1* | 7/2008 | Zhang | D01F 9/1273 423/447.3 |
| 2008/0316580 | A1 | 12/2008 | Gillies et al. | |
| 2009/0119657 | A1 | 5/2009 | Link, II | |
| 2009/0200422 | A1* | 8/2009 | Johnson | B64D 11/0601 244/118.5 |
| 2010/0157180 | A1* | 6/2010 | Doane | G02F 1/133305 349/25 |
| 2011/0114788 | A1* | 5/2011 | Mosler | B64D 11/0023 244/118.5 |
| 2011/0144858 | A1 | 6/2011 | Yun et al. | |
| 2011/0307882 | A1 | 12/2011 | Shiba | |
| 2011/0320089 | A1 | 12/2011 | Lewis | |
| 2012/0062516 | A1* | 3/2012 | Chen | G06F 3/0412 345/173 |
| 2012/0268406 | A1* | 10/2012 | Trachte | B60K 37/06 345/173 |
| 2013/0033378 | A1* | 2/2013 | Donovan | A43B 3/0005 340/540 |
| 2013/0117338 | A1 | 5/2013 | Lynch et al. | |
| 2013/0261881 | A1 | 10/2013 | Scheid et al. | |
| 2013/0328783 | A1* | 12/2013 | Martin | A61B 5/165 345/169 |
| 2013/0338857 | A1 | 12/2013 | Sampigethaya | |
| 2014/0125355 | A1 | 5/2014 | Grant | |
| 2014/0207535 | A1 | 7/2014 | Stefan et al. | |
| 2015/0067950 | A1* | 3/2015 | Jennings | A41D 13/0531 2/455 |
| 2015/0123775 | A1* | 5/2015 | Kerdemelidis | G06F 3/016 340/407.1 |
| 2015/0279320 | A1* | 10/2015 | Hull | A43B 1/0027 345/592 |
| 2016/0098259 | A1 | 4/2016 | Mitchell | |
| 2016/0173530 | A1 | 6/2016 | Miyake | |
| 2016/0376747 | A1* | 12/2016 | Wang | D03D 15/283 428/335 |
| 2017/0024201 | A1 | 1/2017 | Diedrich et al. | |
| 2017/0045797 | A1* | 2/2017 | Yamamoto | A45C 13/08 |
| 2017/0212746 | A1 | 7/2017 | Quin et al. | |
| 2018/0018160 | A1 | 1/2018 | Teraoka et al. | |
| 2018/0152341 | A1 | 5/2018 | Maeda et al. | |
| 2018/0310659 | A1* | 11/2018 | Poupyrev | A61B 5/291 |
| 2019/0112733 | A1* | 4/2019 | Abouraddy | D01F 8/00 |
| 2019/0187291 | A1 | 6/2019 | Troia | |
| 2019/0250900 | A1 | 8/2019 | Troia et al. | |
| 2019/0303581 | A1 | 10/2019 | Quatmann | |
| 2019/0315293 | A1 | 10/2019 | Arai | |
| 2019/0361696 | A1 | 11/2019 | Nakano | |
| 2020/0058210 | A1 | 2/2020 | Williams et al. | |
| 2020/0283931 | A1* | 9/2020 | Abouraddy | D01F 1/04 |

FOREIGN PATENT DOCUMENTS

| | | | |
|---|---|---|---|
| DE | 10 2012 013 550 A1 | 1/2013 | |
| DE | 20 2012 011 759 U1 | 2/2013 | |
| DE | 10 2016 007 255 A1 | 12/2017 | |
| EP | 3546355 A1 | 10/2019 | |
| EP | 3560834 A1 | 10/2019 | |
| WO | WO 2007/093403 A1 | 8/2007 | |

OTHER PUBLICATIONS

Final Office Action for U.S. Appl. No. 16/363,436 dated Oct. 1, 2020.
Non-Final Office Action for U.S. Appl. No. 16/363,436 dated Jun. 24, 2020.
Bellingham, et al., "Direct Integration of Individually Controlled Emissive Pixels into Knit Fabric for Fabric-Based Dynamic Display," IEEE Photonics Journal, Vo. 9, No. 4, pp. 1-10, Aug. 1, 2017.
European Search Report for Application No. 19159223.7 dated Aug. 14, 2019.
Notice of Allowance for U.S. Appl. No. 16/363,436 dated Jan. 11, 2021.
European Search Report for Application No. 19165878.0 dated Oct. 2, 2019.

* cited by examiner

AIRCRAFT AREA HAVING A TEXTILE DISPLAY, AIRCRAFT PASSENGER SEAT HAVING A TEXTILE DISPLAY, AND AIRCRAFT INCLUDING AN AIRCRAFT AREA

TECHNICAL FIELD

The disclosure herein relates to an aircraft area having a textile display, an aircraft passenger seat having a textile display, as well as an aircraft including such aircraft area and/or aircraft passenger seat. In particular, the disclosure herein relates to an aircraft area having an interior component on which a textile display is disposed, a passenger seat having a textile display integrated into a seat cover, as well as an aircraft having such aircraft area and/or aircraft passenger seat.

BACKGROUND

In recent years developments have been made to provide display devices in passenger seats of an aircraft or similar mass transportation vehicle, so that passengers sitting in such passenger seats are able to derive information displayed on the display devices. For instance, in-flight entertainment systems include a personal display device installed on a back side of the passenger seat facing a passenger seat of a (rearwardly) adjacent seat row.

Furthermore, information displays or other placards are installed inside the passenger cabin, for example signs at a ceiling of the passenger cabin or a separating wall inside of the passenger cabin. Such signs and placards display particular text or symbols to indicate an exit, the occupancy of a lavatory, an obligation to fasten seatbelts, etc.

However, such display devices and placards require a certification of regulating authorities. For example, a certificate is required for display devices due to possible injuries to passengers (particularly in case of a crash). On the other hand, particular placards including safety information require a certificate for the chosen formulation, i.e. the displayed wording.

SUMMARY

It is therefore an object of the disclosure herein to provide an aircraft area, aircraft passenger seat and aircraft that reduce the effort during certification and facilitate displaying of information.

This object is achieved by an aircraft area, an aircraft passenger seat, and an aircraft with features disclosed herein.

According to a first example aspect for understanding the present disclosure, an aircraft area comprises an interior component, a textile display disposed on the interior component and including at least one textile fiber capable of changing a color at at least one section of the textile fiber, and a controller operatively coupled to the textile display and configured to change the color of the at least one section of the textile fiber, such that the textile display displays information. The term "interior" as used in this disclosure means inside an aircraft, i.e. inside of an aircraft fuselage.

Since the textile fiber of the textile display can change its color along a section (viewed in a longitudinal direction of the fiber), the textile display is capable of displaying information. For instance, the textile fiber can be arranged in a textile in such a manner, that the at least one section capable of changing its color forms a particular symbol, text or other predefined form within the textile. Alternatively or additionally, if each of a plurality of sections of the fiber can change its color independently from one another, the textile display can be used to display configurable information, such as one or more symbols, text (in one or more lines), etc. In any case, the controller is configured to control the textile fiber to change the color of each of the at least one section, and in particular is configured to control each of the at least one section of the textile fiber to change its color independent of the other section(s). The at least one section can have a predefined length in the longitudinal direction of the fiber. A longer section can be used to display a particular symbol or form, while a short section (and particularly a plurality of short sections) can be used as pixels of a display area. The term "textile" means any woven, nonwoven or knitted fabric, so that "fabric" and "textile" are interchangeable in this disclosure.

The textile display can form or can be integrated in a textile that covers the interior component and/or a textile mounted to and/or integrated into a surface of the interior component and/or a textile forming at least a portion of the interior component. Thus, while providing a visible surface of the interior component, the textile can be used to display various and/or controllable information. This reduces the effort during certification, since the formulation and/or symbol usually printed or otherwise fixedly provided on a placard can be set at any time with the textile display. Furthermore, the effort during certification is further reduced, since the certification with respect to fire resistance is only required once for the fabric and not for conventional display devices and additionally for conventional fabrics used in the aircraft.

Moreover, since it is a textile, the textile display does not cause any injury, if someone hits the display. Specifically, the rather soft textile display does not include a rigid screen that may splinter if hit and does not have any sharp edge. Therefore, safety can be increased.

Furthermore, the textile display can also be cleaned (washed or dry-cleaned). Thus, the overall appearance of the aircraft area and/or interior component can be enhanced at usual time intervals all at once, without difficulties commonly involved with removing and re-installing of fixed display devices.

According to an implementation variant, the textile fiber is an electrophoretic fiber capable of changing the color of (each of) the at least one section, if an electric field is applied to the at least one section of the textile fiber. An electric field can be applied to the at least one section of the textile fiber in response to a command from the controller, so that the controller is capable of controlling the information that is displayed on the textile display. Likewise, the controller is capable of changing the displayed information. For instance, the textile fiber and/or another fiber provided adjacent to (or close to) the at least one section of the textile fiber of the textile display may include one or more electrically conductive paths. For example, the fiber can be covered or can include an electrically conductive material, such as carbon nanotubes or the like, which forms at least one electrically conductive path along the fiber. Thus, an electric field may be generated at or adjacent to the at least one section of the textile fiber of the textile display, in order to change the color of the at least one section of the textile fiber. The controller may be electrically connected to the textile fiber, i.e. to the electrically conductive path, in order to generate the electric field.

According to another implementation variant, the textile fiber is a thermochromic fiber capable of changing the color of the at least one section, if a temperature change is applied to the at least one section of the textile fiber. As with the electrophoretic fiber, the textile fiber of the textile display and/or another fiber provided adjacent to (or close to) the at least one section of the textile fiber of the textile display may be formed, so that it generates a temperature increase or decrease. For example, the fiber may be electrically conducting and may have a particular resistance, in order to generate a temperature increase, or may form a Peltier element. Again, the fiber can be covered or can include an electrically conductive material, such as carbon nanotubes or other material that emits heat or cools when an electric current is applied.

According to a further implementation variant, the textile fiber can have a light-emitting device (e.g. an LED). For instance, an LED may be arranged inside or on the surface of the textile fiber, while the textile fiber includes at least one electrically conductive path, in order to power the light emitting device under control of the controller. Thus, the controller is connected to the at least one electrically conductive path.

In any case, the textile display may be a woven or knitted textile including one or more textile fibers of any of the described variants, i.e. one or more textile fibers of the electrophoretic type, and/or one or more textile fibers of the thermochromic type, and/or one or more textile fibers having (a) light-emitting device(s), and/or one or more textile fibers configured to generate an electric field, generate heat and/or cool in response to a command of the controller. The latter type of textile fibers may be configured to generate an electric field, generate heat and/or cool at least at one or more sections of the fiber in response to a corresponding command of the controller, such as application of a particular current. Furthermore, fibers can be arranged perpendicularly to one another, so that electric fields or heat or a low temperature can be generated at specific intersections of fibers, thereby allowing the change of color and/or emission of light at at least one section of a textile fiber in a pixel-like manner.

Thus, a display capable of displaying readable information (characters, numbers, symbols, pictograms, etc.) can be included in the textile, which is used to cover an interior component. Thus, the interior component may be fashioned in any manner desired by the operator of the aircraft, while a textile display is already integrated into the cover. This allows the omission of independent display devices, which are usually rigid and bulky, so that the aircraft area can be made lightweight and thinner. Moreover, the aircraft area can be customized at any time by providing the textile display at any desired location and/or by providing a cover for the interior component having a textile display at a desired portion thereof and/or by displaying information at any desired portion of the textile display (e.g. displaying information only on a part of the entire area of the textile display). Thus, modification of the displayed information and overall appearance is made easier.

In an implementation variant the interior component is a monument wall. In this case the textile display can form at least a portion of the surface of the monument wall. For example, the textile display can be provided on a surface of the monument wall facing a passenger cabin. Alternatively, the textile display can be provided on a surface of the monument wall facing an interior of the monument, such as the interior of a lavatory, a closet, a cabinet, a galley, etc. Likewise alternatively, the textile display can form a part of the monument wall or may be integrated into the monument wall. For example, the monument wall may have a recess, an opening, and/or a through hole through the monument wall (in a thickness direction of the monument wall), while the textile display is mounted inside the recess, opening and/or through hole in a manner that a plane defined by the textile display is approximately parallel to a plane defined by the monument wall, i.e. approximately parallel to a (usual) surface of the monument wall.

According to a further variant, the textile display can be attached to the monument wall, e.g. by an adhesive or a hook-and-loop fastener. The textile display may form a portion of a cover covering the entire monument wall or may extend over the entire cover. Thus, the monument may be provided with a visually appealing surface, at least a portion of which is capable of displaying (readable) information. For example, the textile display on the monument wall may be capable of displaying a flight number, a seating category (economy, business, first class, etc.), an occupancy of a lavatory, a non-smoking sign, flight information, etc.

In any case, the overall weight of the monument wall and, hence, the entire monument can be reduced. Specifically, the textile display and/or textile cover attached to and/or integrated into the monument wall is lighter than the usual material for the monument wall.

In a further implementation variant the interior component is a passenger seat. For example, the interior component may be a passenger seat mounted in a passenger cabin of an aircraft. In this regard, the textile display can form at least a portion of a seat cover of the passenger seat. This provides a lightweight solution for displaying information directly on the passenger seat. In addition, since the majority of passenger seats have a seat cover, the effort for manufacturing the seat is reduced, since independent display devices need not be installed on the seat. Moreover, as the textile display is soft compared to usual rigid display devices, the risk of injury of passengers is significantly reduced.

For example, the textile display can form at least a portion of a seat cover covering a back rest of the passenger seat. Thus, the textile display may be provided on any portion of the backrest, including the portion, at which a passenger sitting in the passenger seat usually rests the passenger's back. Alternatively or additionally, the textile display may be provided at at least one portion of the backrest facing the adjacent seat row (rearward seats) of the aircraft. The textile display may, of course, form the entire cover of the backrest.

Alternatively or additionally, the textile display can be disposed at a front side and/or a back side of a head rest of the passenger seat. Thus, information can be displayed in the direction in front of and/or in the back of the passenger seat. Thus, a person standing in front of the seat and viewing the passenger seat is capable of seeing (reading) the displayed information, such as information about the seat (row and seat number), the passenger who has booked the seat (name and/or status). Likewise, a person standing behind the seat and viewing the passenger seat may be capable of seeing (reading) the displayed information on the back of the seat, if the textile display is disposed on the back of the seat and faces rearwardly.

Also alternatively or additionally, the textile display can form at least a portion of the seat cover covering a seat pan of the passenger seat. Likewise alternatively or additionally, the textile display can form at least a portion of an armrest of the passenger seat.

Thus, at least one portion or even the entire passenger seat can be used as a display.

For instance, a passenger searching the booked seat may be guided by changing the color of at least a portion of the seat cover distinguishing from the remaining seats. The corresponding passenger could be identified by an identifier, such as a wireless RFID-chip tagged to the passenger and/or the passenger's ticket, luggage, specific device, etc., or an acoustic input made by the passenger or a cabin crew member articulating the name of the passenger and/or the seat row and number. For such implementation variants, the controller is capable of receiving signals representing the identification of the passenger and is further capable of changing the color and/or displaying readable information on the textile display in response to an identification of the passenger.

In another implementation variant the interior component is a floor of a passenger cabin. The textile display may form part of or may be integrated into a textile floor cover. Thus, visual information can be provided to passengers and/or crewmembers on the floor. For example, the occupancy of a lavatory, the seat location of a passenger requesting help from a flight attendant, etc. maybe indicated on the floor. Likewise, in case of an emergency, the way to the nearest exit can be displayed on the floor.

In yet another implementation variant, the interior component is a door of the aircraft. The textile display can be installed, mounted or integrated into a portion of the door facing the interior of the aircraft (fuselage), when the door is closed. Such textile display can further be used to display information even when the door is opened. In the opened state the portion of the door facing the interior of the aircraft when closed usually faces to the outside, i.e. the door has been turned around approximately 180°. Thus, information can be presented to viewers standing outside of the aircraft, such as information on the flight (flight number, flight time, destination, etc.), and/or customized information (name of the airline, advertisement, etc.).

Another implementation variant provides a textile display forming at least a portion of a lining, i.e. an interior component forming a cover of a wall or ceiling of the aircraft fuselage. This allows changing the overall appearance of a portion of the lining and, hence, a portion of the interior of the aircraft, such as a portion of the passenger cabin. For instance, a color of the ceiling and/or sidewalls of the passenger cabin can be adapted, according to a desire of the aircraft provider. Moreover, information may be displayed at the ceiling and/or sidewalls of the passenger cabin, such as seat row numbers, cabin class details, etc. or pictures can be displayed at the ceiling and/or sidewalls of the passenger cabin, in order to enhance passenger experience.

According to a further implementation variant the aircraft area comprises a personal input unit configured to receive user inputs. Such personal input unit may include at least one input device, such as a key, a button and/or a touch input device. The controller can be configured to receive an input signal from the personal input unit representing the received user input. For example, the user input may be a command to switch on a personal reading light, requesting help from a flight attendant, adjusting a volume of speakers, adjusting the level of sunshades at a window, control information displayed on a personal display, such as a textile display provided on a passenger seat in front of the passenger operating the personal input unit. The personal input unit may be disposed on the seat of the passenger, i.e. a seat behind the seat having the associated textile display. The personal input unit can be operatively connected to the controller. Thus, the controller may control the information displayed on the textile display in response to receiving a user input from the personal input unit.

In a specific implementation variant, the personal input unit is integrated into the textile display. For instance, the personal input unit may be touch sensitive, while the touch sensitive devices are formed on or in or are integrated into a textile fiber forming at least a part of the textile display or a portion of a textile adjacent to the textile display. Thus, the textile display can form a touchscreen. This facilitates controlling of the displaying of information on the textile display, since the textile display, controller, and personal input unit can be formed close to one another, i.e. can form a unit. This eliminates complicated controlling and wiring of personal display units and personal input units, which are conventionally installed on different passenger seats in subsequent rows of passenger seats (e.g. the personal display unit being installed on a seat in front of the seat having the personal input unit).

According to a further aspect to understand the present disclosure, an aircraft passenger seat comprises a back rest, a seat pan, and a textile display integrated into a seat cover covering the backrest and/or the seat pan. The textile display can include at least one textile fiber capable of changing a color at at least one section of the textile fiber. Thus, the aircraft passenger seat is provided with a lightweight and soft display, so that the effort for certification is reduced and a risk of injury is omitted. Furthermore, in case the seat cover has to be replaced, such maintenance can be achieved faster, since there is no independent display device to be dismounted and remounted.

Optionally, the aircraft passenger seat may additionally comprise a controller operatively coupled to the textile display and configured to change the color of the at least one section of the textile fiber, such that the textile display displays information.

Additionally or alternatively, the passenger seat can comprise a personal input unit operatively connected to the controller. For example, the textile display may include one or more touch sensitive fiber portions, so that the textile display forms a touchscreen.

According to another aspect to understand the present disclosure, an aircraft comprises an aircraft area according to the first aspect. Additionally or alternatively, the aircraft may comprise an aircraft passenger seat according to the second aspect.

The present disclosure is not restricted to the aspects and variants in the described form and order. Specifically, the description of aspects is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

BRIEF DESCRIPTION OF THE DRAWINGS

Preferred embodiments of the disclosure herein are now explained in greater detail with reference to the example, schematic drawings, in which.

DETAILED DESCRIPTION

Figure 1:
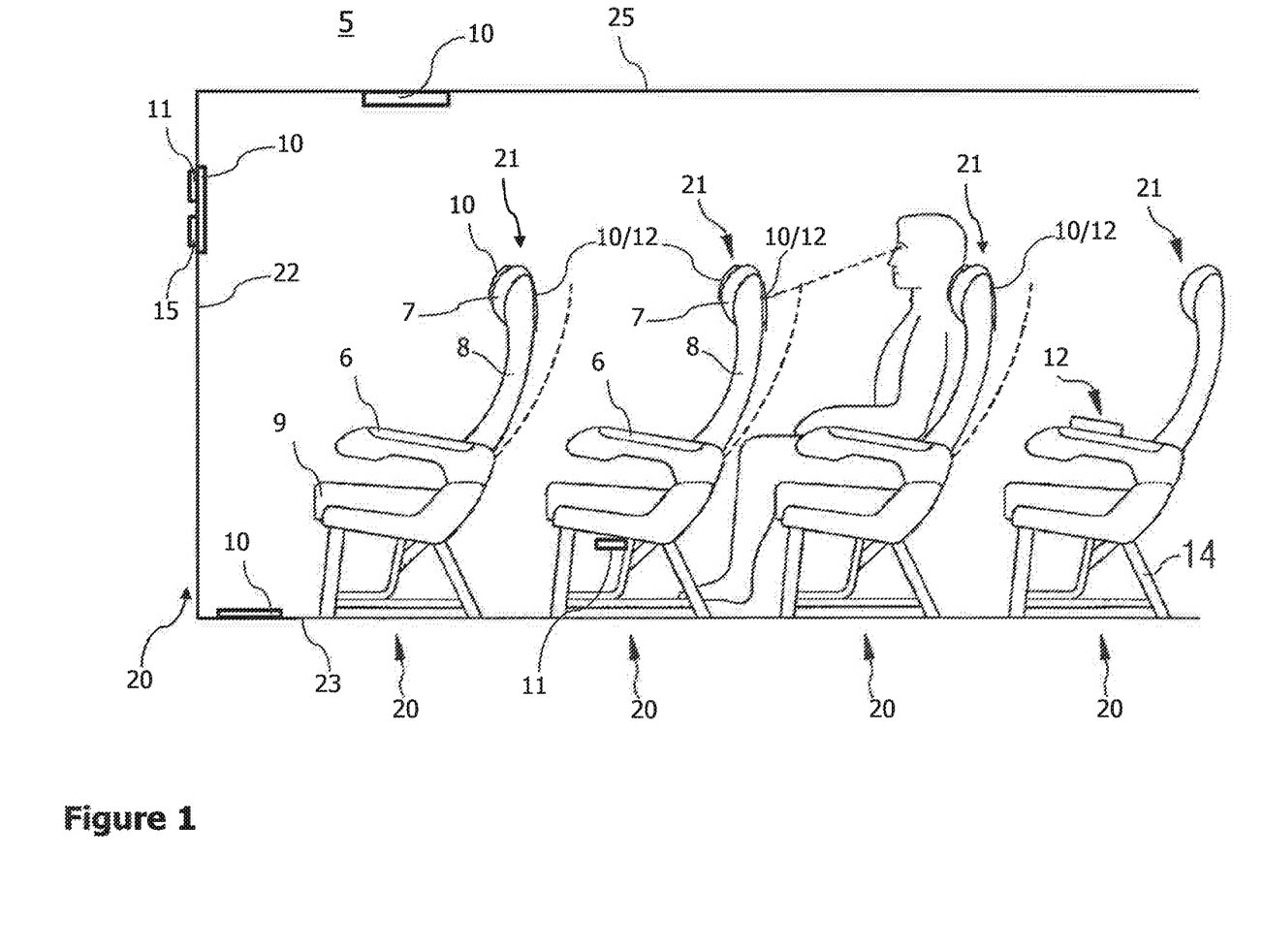
FIG. 1 schematically illustrates a side view of an aircraft area.

FIG. 1 schematically illustrates a side view of an aircraft area 5. Some of the details of the aircraft area 5 are illustrated multiple times. For clarity and readability reasons, some of these details have not been provided with reference signs.

The aircraft area 5 can comprise at least one interior component 20, such as a passenger seat 21 and/or a monument wall 22 and/or a door 24 (FIG. 3) of the aircraft 1. The aircraft area 5 further comprises a textile display 10 disposed on the interior component 20. The textile display 10 may include at least one textile fiber 31 (FIG. 2) capable of changing a color at at least one section 32 of the textile fiber 31. In order to change the color and display information on the textile display 10, a controller 11 (exemplarily illustrated at monument wall 22 and under the second seat 21) is operatively coupled to the textile display 10 and configured to change the color of the at least one section 32 of the textile fiber 31.

Figure 3:
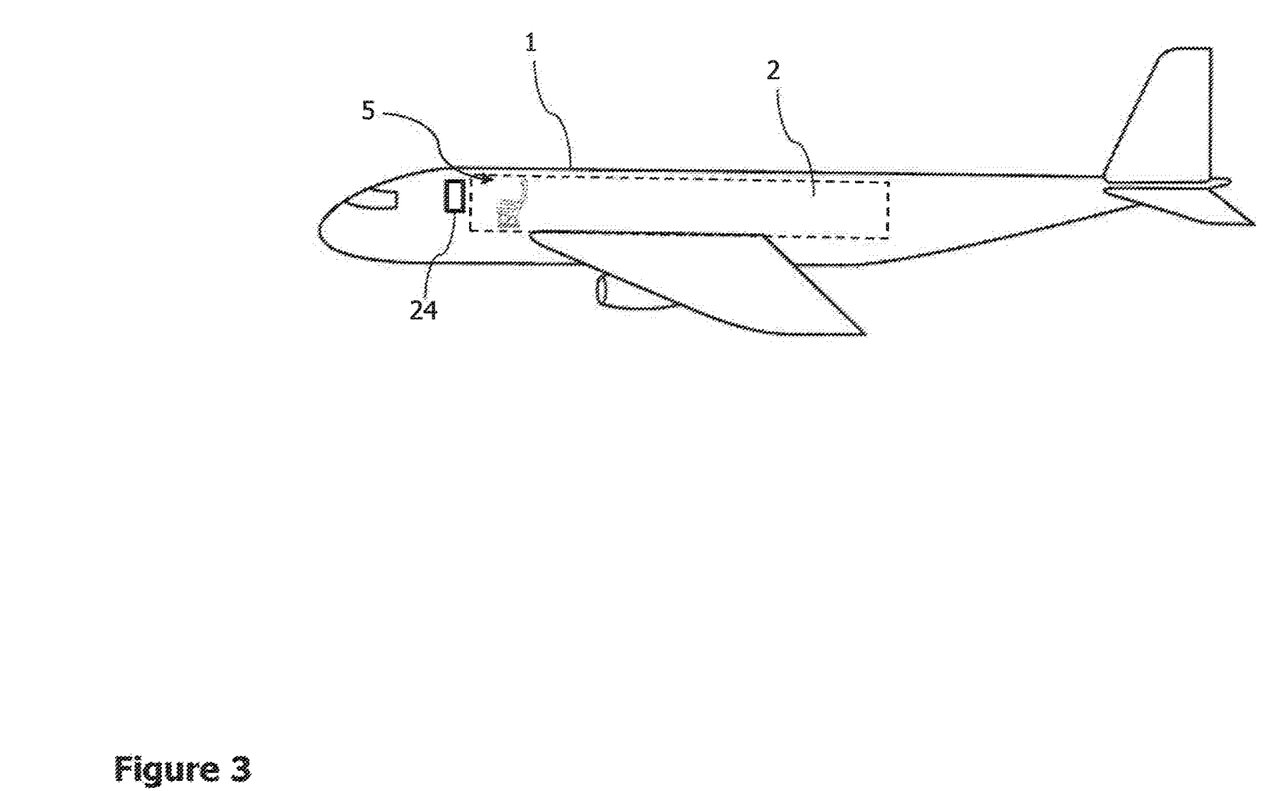
FIG. 3 schematically illustrates an aircraft.

The textile display 10 may form at least a portion of a surface of the interior component 20. For instance, a textile display 10 may be attached to a surface of a monument wall 22 or, alternatively, may form at least a portion of a cover covering at least a portion of the monument wall 22. The textile display 10 is capable of displaying information visible and/or readable from the passenger cabin. Alternatively or additionally, a textile display 10 may form a portion of a curtain (not explicitly illustrated), such as a curtain separating different seating classes or a galley from a passenger cabin 2 (FIG. 3).

At least one textile display 10 can form a portion of a surface of a passenger seat 21. The passenger seat 21 includes at least a backrest 8 and a seat pan 9, and optionally a headrest 7 and is mounted to a floor 23 of the passenger cabin with a seat base 14. Seat base 14 may further include wiring (not illustrated) for providing power and data to the textile display 10. The textile display 10 forms at least a portion of a seat cover of at least a portion of the passenger seat 21. For example the textile display 10 can be disposed at any portion of the armrest 6, backrest 8, seat pan 9 and/or headrest 7. Multiple textile displays 10 can also be provided in the seat cover. FIG. 1 exemplarily illustrates a textile display 10 at a headrest 7 facing in a forward direction (to the left in FIG. 1) and further illustrates a textile display 10 at a headrest 7 facing in a rearward direction (to the right in FIG. 1).

A further optional manner of employing a textile display 10 is the integration into a textile cover of the floor 23 of the passenger cabin. Also optionally, a textile cover having one or more textile displays 10 can be provided at a ceiling 25 and/or a side wall of the passenger cabin 2. For example, a lining covering the primary structure of the aircraft and other installation items provided at the primary structure may include or may be formed by a textile cover having one or more textile displays 10. Thus, information can be displayed at almost any portion of the passenger cabin 2.

The aircraft area 5 may further comprise an input unit 12 that is arranged at a passenger seat 21. The input unit 12 can be operatively connected to the controller 11 for changing the information displayed on a textile display 10, such as textile display 10 disposed on a back side of passenger seat 21 directly in front of passenger seat 21 having the input unit 12. Thus, a passenger can use the input unit 12 to operate the textile display 10, in particular to control the information displayed on the textile display 10. Alternatively or additionally, the input unit 12 may be integrated into the textile display 10, so that textile display 10 functions as a touchscreen. Likewise alternatively or additionally, a controller 11 can be arranged in the passenger seat 21 (not explicitly illustrated) for controlling the textile display 10 of the same passenger seat 21 and/or being operatively connected to a personal input unit 12 of the same passenger seat 21.

In order to provide the information to be displayed on any of the textile displays 10, the aircraft area may further comprise a receiver 15. The receiver 15 may be capable of receiving signals in a wireless or wired manner. Based on the received signals, the receiver 15 may communicate the received signals to the controller 11 (or several controllers 11 arranged in passenger seats 21) and/or may store the received signals or information processed from the received signals in a storage device (not illustrated). The received signals may represent information to be displayed on one or more of the textile displays 10, such as a seating category of the portion of the passenger cabin 2 including the textile displays 10, the obligation to fasten seatbelts, the occupation of a lavatory, flight details, etc. In case of an emergency, corresponding information and guidance to the nearest exit may be transmitted to receiver 15, so that (one or more) controller(s) 11 can display the corresponding information on one or more of the textile displays 10. Thus, the textile displays 10, controller(s) 11 and receiver 15 are operatively coupled to one another, at least for exchange of electric and/or electronic signals.

The signals may be transmitted from an input unit (not explicitly illustrated) for a crew member and/or a pilot, similar to the controller 11 at the monument wall 22. For example, such input unit may form part of a flight attendant panel (FAP). Alternatively or additionally, the signals may be transmitted from a device outside the aircraft 1. For instance, the signals may be transmitted to an aircraft cabin management system, such as a cabin intercommunication data system (CIDS). Thus, the displayed information of one or more textile displays 10 may be input in a centralized manner. It is to be understood that the input unit for a crew member and/or a pilot may be combined with or integrated into a controller, such as the controller 11 provided at a monument wall 22.

Figure 2:
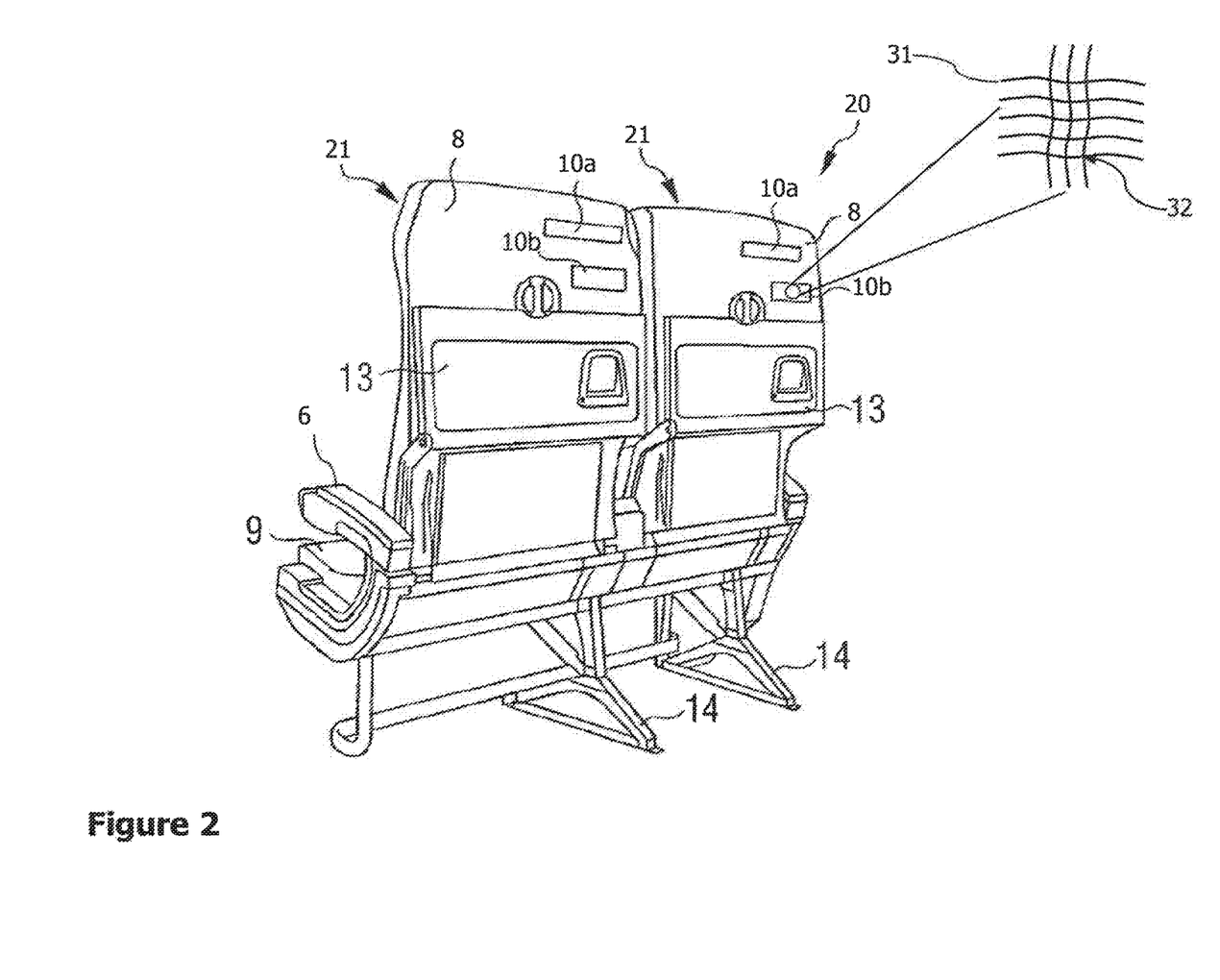
FIG. 2 schematically illustrates an interior component in form of multiple passenger seats and a detail of the textile display.

FIG. 2 illustrates a backside of an interior component 20 in form of a seat row comprising two passenger seats 21. The passenger seats 21 are mounted on a seat base 14 and may comprise an armrest 6, seat pan 9, backrest 8 and optionally a headrest 7, as well as tray tables 13 for a passenger sitting in a seat (not illustrated in FIG. 2) arranged behind the illustrated passenger seats 21.

Each passenger seat 21 may be covered by a seat cover into which at least one textile display 10*a* and 10*b* is integrated. In more detail, such seat cover may cover at least a portion of the armrest 6, seat pan 9, backrest 8 and/or headrest 7. For example, a first textile display 10*a* may be used to provide information specific for the passenger sitting behind textile display 10*a*. A second textile display 10*b* may be used to provide more generic information, such as flight information, the obligation to fasten seatbelts, the occupation of a lavatory or the like.

Each textile display may be composed of one or more textile fibers 31 as illustrated in the detailed depiction of right textile display 10*b*. A textile fiber 31 may be of an electrophoretic type, a thermochromic type and/or may include one or more light-emitting devices. In any case, the textile fiber 31 is capable of changing a color at at least one section 32 of the textile fiber 31 in a controllable manner. Such at least one section 32 of the textile fiber 31 can be an intersection of woven fibers that are arranged substantially perpendicularly to one another. Alternatively or additionally, the at least one section 32 may be specified by adjacent fibers 31. For instance, while one fiber 31 is capable of changing color at at least one section 32, one or more adjacent fibers (running substantially parallel to the one fiber 31) may be capable of generating an electric field or heat, to activate the color change at the at least one section 32 of the one fiber 31.

FIG. 3 schematically illustrates an aircraft 1 comprising a passenger cabin 2 having an aircraft area 5. Any textile display 10 can also be installed in an aircraft area 5 other than the passenger cabin 2, such as a cockpit, a cargo area, etc.

For instance, a textile display 10 may be fixedly or removably installed at any portion of the aircraft area 5. This includes a door 24 of the aircraft 1 at a side of the door 24 facing the interior of the passenger cabin 2, when the door 24 is closed. Thus, the textile display(s) 10 on the door 24 can also be used to display information when the door 24 is opened and faces an environment of the aircraft 1. For example, information about the flight (e.g. destination, time of departure/arrival etc.), information on the air carrier, and/or an advertisement can be displayed and is visible for viewers outside of the aircraft having a perspective similar to the one illustrated in FIG. 3.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft area comprising:
an interior component;
a textile display disposed on the interior component, wherein the textile display is configured to display readable information and comprises touch sensitive devices in a form of textile fibers that form the textile display, such that at least a part of the textile display is configured to receive user touch inputs directly thereon and the textile display is configured as a touchscreen, wherein the textile fibers are configured to change a color at at least one section of each of the textile fibers;
a controller operatively coupled to the textile display and configured to change the color of the at least one section of each of the textile fibers, such that the textile display displays the readable information thereon;
wherein the touch sensitive devices are operatively connected to the controller.

2. The aircraft area according to claim 1, wherein the textile fibers are electrophoretic fibers capable of changing the color of the at least one section when an electric field is applied to the at least one section of one or more of the textile fibers.

3. The aircraft area according to claim 1, wherein the textile fibers are thermochromic fibers capable of changing the color of the at least one section when a temperature change is applied to the at least one section of one or more of the textile fibers.

4. The aircraft area according to claim 1, wherein the interior component is a monument wall, and wherein the textile display forms at least a portion of a surface of the monument wall facing a passenger cabin.

5. The aircraft area according to claim 1, wherein the interior component is a passenger seat mounted in a passenger cabin, and wherein the textile display forms at least a portion of a seat cover of the passenger seat.

6. The aircraft area according to claim 5, wherein the textile display forms at least a portion of a seat cover covering a back rest of the passenger seat, and wherein the textile display is disposed at a front side and/or back side of a head rest of the passenger seat.

7. The aircraft area according to claim 5, wherein the textile display forms at least a portion of the seat cover covering a seat pan of the passenger seat.

8. The aircraft area according to claim 1, wherein the interior component is a floor of a passenger cabin of the aircraft.

9. The aircraft area according to claim 1, wherein the interior component is a door of the aircraft.

10. An aircraft comprising an aircraft area according to claim 1.

11. An aircraft passenger seat comprising:
a back rest;
a seat pan;
a head rest;
a textile display integrated into a seat cover covering the backrest, the seat pan, and/or the head rest, wherein the textile display is configured to display readable information and comprises touch sensitive devices in a form of textile fibers that form the textile display, such that at least a part of the textile display is configured to receive user touch inputs directly thereon and the textile display is configured as a touchscreen, wherein the textile fibers are configured to change a color at at least one section of each of the textile fibers; and
a controller operatively coupled to the textile display and configured to change the color of the at least one section of each of the textile fibers, such that the textile display displays the readable information thereon;
wherein the touch sensitive devices are operatively connected to the controller.

12. An aircraft comprising an aircraft passenger seat according to claim 11.

13. The aircraft passenger seat according to claim 11, wherein the textile fibers are electrophoretic fibers capable of changing the color of the at least one section when an electric field is applied to the at least one section of one or more of the textile fibers.

14. The aircraft passenger seat according to claim 11, wherein the textile fibers are thermochromic fibers capable of changing the color of the at least one section when a temperature change is applied to the at least one section of one or more of the textile fibers.

15. The aircraft passenger seat according to claim 11, wherein the textile display is disposed on a rear external surface of the back rest.

16. The aircraft passenger seat according to claim 11, wherein the textile display is disposed on an external surface of the seat pan.

17. The aircraft passenger seat according to claim 11, wherein the textile display is disposed on a front external surface and/or a back external surface of the head rest.

18. An aircraft area comprising:
  an interior component;
  a textile display disposed on the interior component, wherein:
    the textile display comprises textile fibers that form the textile display;
    the textile display is configured to display readable information;
    the textile display is configured to receive user touch inputs directly thereon, such that the textile display is configured as a touchscreen; and
    the textile fibers are thermochromic, such that the textile fibers are configured to change a color of at least one section thereof when a temperature change is applied to the at least one section of one or more of the textile fibers; and
  a controller operatively coupled to the textile display and configured to control the color of the textile fibers so that the textile display displays the readable information thereon;
  wherein the touch sensitive devices are operatively connected to the controller.

19. The aircraft area according to claim 18, wherein the interior component is a floor of a passenger cabin of the aircraft or a door of the aircraft.

20. An aircraft comprising an aircraft area according to claim 18.

* * * * *